July 17, 1962 A. W. LATHAM 3,044,810
COUPLING
Filed Sept. 25, 1959 2 Sheets-Sheet 1
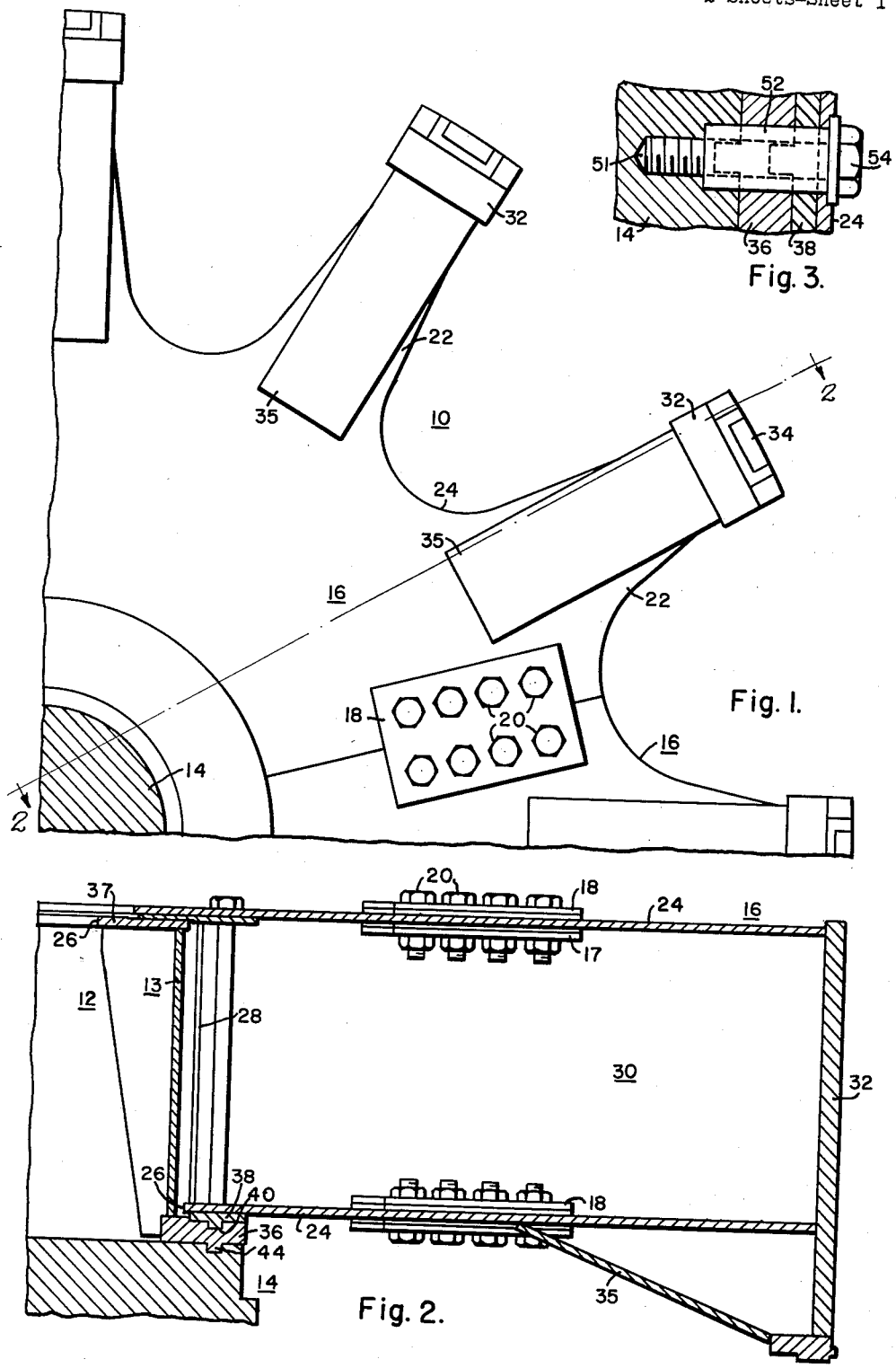

July 17, 1962
A. W. LATHAM
3,044,810
COUPLING
Filed Sept. 25, 1959
2 Sheets-Sheet 2
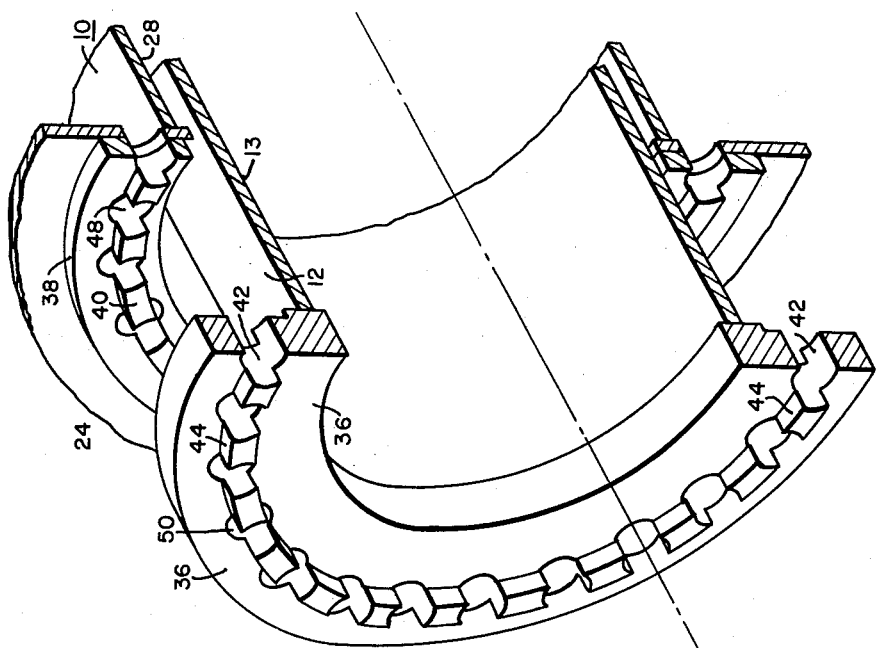
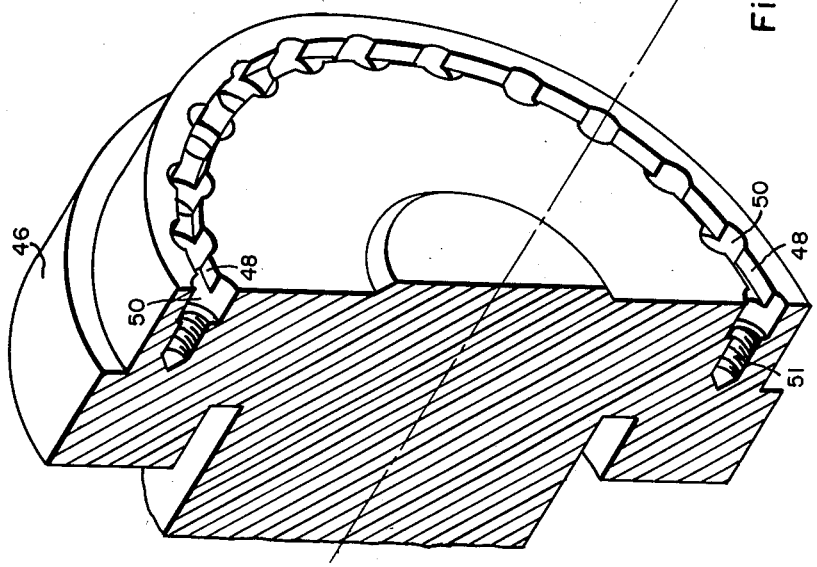
Fig. 4.

United States Patent Office 3,044,810
Patented July 17, 1962

3,044,810
COUPLING
Albert W. Latham, Murrysville, Pa., assignors to Westinghouse Electric Corporation, East Pittsburgh, Pa., a corporation of Pennsylvania
Filed Sept. 25, 1959, Ser. No. 842,421
3 Claims. (Cl. 287—53)

The present invention relates to a coupling for connecting rotatable elements in longitudinal alignment and, more particularly, to a coupling for a shaft of a dynamoelectric machine in which the shaft is coupled to a hub of a rotor spider of a large dynamoelectric machine.

Bolts or dowels used to couple shafts to rotor spiders in large rotating machines, as for example water wheel generators, are subjected to relatively large shear and bending stresses. In the usual construction, the portions of the shaft and the spider which are to be coupled together have flanges which lie in abutting position with aligned holes in the flanges. Bolts or shrunk-in dowels are received in the aligned openings. Thus, the forces are applied in two different planes resulting in relatively large shear and bending stresses. This requires that the length of the dowel and therefore the depth of the hole must be relatively great in order to keep the stresses within allowable limits when transmitting large torques. Another serious problem is the proper alignment of the parts. This usually requires a separate spigot fit which results in expensive milling and hobbing machining operations.

Another problem which arises in the manufacture of rotors for large rotating machines is the transmission of torques to the shaft from a large fabricated spider. Many of the present spiders are fabricated from pieces of sheet steel. The spiders are usually assembled in halves. They are then coupled together by plates and the shaft is attached to the fabricated spider. It is because these spiders are so large in diameter that an entire spider assembly could not be shipped by ordinary available shipping means. Thus each spider half is assembled at the manufacturing site and shipped to the site where it is to be installed. The halves are assembled together at the installation site. In the transmission of large torques from the spider to the shaft unsymmetrical stresses may occur due to the mode of assembly of the spider halves.

One of the objects of the present invention is to provide an improved assembly for transmitting torques between the rotor and the rotor shaft in dynamoelectric machines.

Another object of the invention is to provide an improved coupling for connecting rotatable parts in longitudinal alignment which eliminates shear and bending stress on the connecting bolts or dowels.

A further object of this invention is to provide an improved assembly for transmitting torque between the shaft and the rotor in a dynamoelectric machine and which utilizes an improved coupling for connecting the rotating parts in longitudinal alignment in a manner which eliminates shear and bending stresses on the connecting pin.

A still further and more specific object of the invention is to provide an improved rotor assembly for a large rotating machine utilizing a fabricated rotor member including semicyclindrical parts secured together to form a large diameter cylinder, a solid hub secured to the cylinder and a shaft connected to the hub. The shaft, rotor and hub are secured together by an improved coupling.

A still further object of the invention is to provide an improved coupling for connecting rotatable parts in longitudinal alignment by utilizing an engagement or intermeshing of parts around a common connecting pin thereby eliminating shear and bending stresses.

A still further object of this invention is to provide a coupling for connecting rotatable parts in longitudinal alignment which utilizes intermeshing parts around a common connecting pin to axially align the shafts and to eliminate the necessity of a separate spigot fit and expensive machining operations as well as to eliminate bending and shear stresses by subjecting the connecting pins only to compression forces all in the same plane.

Other objects and advantages of the invention will be apparent from the following detailed description of the invention, taken in connection with the accompanying drawings, in which:

FIGURE 1 is a partial front elevational view of the spider portion of the rotor of a large dynamoelectric machine;

FIG. 2 is a partial transverse sectional view of the rotor of a dynamoelectric machine taken on line 2—2 of FIG. 1;

FIG. 3 is an enlarged view partly in section of the coupling of this invention; and FIG. 4 is an exploded view of the hub, a portion of the spider and the shaft incorporating the coupling construction of this invention.

In FIGURES 1 and 2 there is shown a portion of the rotor of a large dynamoelectric machine, such as a water wheel generator, including a spider 10, a hub 12 and a shaft 14. The spider 10 comprises a pair of semicylindrical spider halves 16. Each spider half 16 comprises a pair of semicircular plates 24 having circumferentially spaced, radially outwardly extending arms 22. The plates 24 are disposed in face to face relation with their outwardly extending arms 22 in alignment. Plates 24 each have a concentric opening 26. They are secured together in face to face relationship, with their radial arms 22 in alignment, by a semicylindrical member 28 adjacent the central opening 26. Semicylindrical member 28 spans the distance between the faces of the plates and is secured to each of the plates 24 as by welding or any other suitable means. The plates are further secured together by rectangular plates 30 extending between opposing radial arms 22. The plates 30 are secured to each of the plates 24 by welding or any other suitable or desirable means.

The machine illustrated in the drawing is a very large machine. The spider illustrated, by way of example, would have a radius of fifteen feet and a spider half would weigh approximately thirty tons. It will of course be understood that the invention herein described may be applied to larger or smaller rotating machinery. However, in order to ship a machine of the size illustrated and described by available transportation facilities it is necessary to build the half spiders at the point of manufacture and to assemble them at the site of use thereby building a complete spider at the site. The spider halves are assembled with their diameters in juxtaposition to form a substantially cylindrical spiper having a plurality of circumferentially spaced arms extending outwardly therefrom. The semicircular openings when disposed in this position form a central opening in the spider. The spider halves may be secured together at the points which contact each other by welding or any other suitable securing means. In addition, plates 18 may be employed with a portion thereof being secured to each half as by bolts 20 or in any other suitable manner.

At the tips of each radial arm of the spider is secured a cross bar 32 extending from one plate 24 to the opposing plate 24. Cross bar 32 may include an axial groove 34, if desired; this may be a dove-tail groove, as shown, or any suitable type of groove for securing a rim and poles to the spider arms 22 in the case of a rotor for a dynamoelectric machine. It should also be noted that the central opening 26 in the spider 10 on the upper plate 24 as seen in FIG. 2 is of smaller diameter than the central opening 26 formed by the lower plates 24. The reason for this will be explained hereinbelow. The cross bars 32, as best seen in FIG. 2, extend beyond the plates 24 and the distance between the end of the cross bar 32 and the lower plate 24, as seen in FIG. 2, is greater than the distance between the upper end of the cross bar and the upper plate 24. A reinforcing plate 35 extends from the lower end of cross bar 32 to the body of the spider as clearly shown in FIGS. 1 and 2. It will of course be understood that the extension of bar 32, as shown, is for purposes of illustration. Bar 32 could extend outwardly beyond both upper and lower plates 24. In some cases there may be no extension at all.

It should be apparent that when a spider of this size is rotating and has a shaft secured directly thereto and is transmitting torque between the rotor and the shaft, unsymmetrical stresses may occur in the spider which are likely to cause failure. This is due to the fabricated nature of the spider and the fact that it is constructed in two separate halves secured together. To overcome this problem, a solid hub 12 is provided. The hub 12 comprises a cylindrical tube 13 which is of one piece construction and which is cast or otherwise formed in an integral construction. The hub 12 has an outwardly, radially extending flange 36 and a closure 37 at the top thereof as seen in FIG. 2. The flange 36 is at the bottom end of the cylindrical tube 13 as seen in FIG. 2. This tube is received in the central opening of the spider 10 through the lower opening 26 in lower plate 24 and extends from the lower end of the spider to the upper plate 24.

The hub 12 is of smaller diameter than the opening 26 of lower plate 24 but of larger diameter than the opening 26 in upper plate 24. With this arrangement the hub 12 can be inserted through the lower plate 24 of the spider and abutted against the upper plate 24 adjacent the edge of the opening 26. The hub 12 is secured to the upper plate along this abutting surface and may be secured by use of dowels, bolts or welding or in any other suitable or desirable manner.

A ring 38 is secured to the lower plate 24 about the periphery of the central opening 26 as by welding or any other suitable means. The ring 38 has an annular projection 40 intermediate its inner circumference and its outer circumference. The projection 40 extends outwardly from the spider and the plate 24. The surface of flange 36 and hub 12 which faces the ring 38 on spider plate 24 has an annular groove 42 therein which receives the annular projection 40 in close fitting engagement. On the surface of the flange 36 of hub 12 opposite the groove surface an annular projection 44 in alignment with groove 42 and projection 40 extends outwardly from the plate 24. The shaft 14 at its end adjacent the spider 10 has an enlarged portion 46. The enlargement 46 on shaft 14 has an annular groove 48 disposed in alignment with the projections 40 and 44 and the groove 42 and is adapted to receive in close fitting engagement the annular projection 44.

Extending through each of the projections 40 and 44 and through each of the grooves 42 and 48 are a plurality of circumferentially spaced openings 50. The openings are shown as being of a diameter larger than the width of the projections and the grooves. These openings 50 are regularly spaced so as to effectively form with projections 40 and 44 a plurality of circumferentially spaced teeth. The spider 10, the hub 12 and the shaft 14 are so disposed relatively to each other as to dispose the openings 50 in alignment with each other. The openings 50 in enlarged portion 46 of shaft 14 are blind openings. At the base of the opening 50 is a blind threaded bolt receiving portion 51. Hollow dowel pins 52 are received through the openings 50. A single pin 52 passes through the openings 50 of the hub, the spider and the shaft.

Bolts 54 having their end portions remote from the head threaded and adapted to be received in threaded portions 51 of openings 50 in the shaft 14 extends through the upper and lower plates 24 of the spider and through the dowels 52 and are received by the threaded portions 51. The bolts 54 tie the spider, the hub and the shaft together.

It can now be seen that this type of construction utilizing a fabricated spider comprising two semicylindrical halves secured together to form a large cylindrical element with a solid hub for securing the shaft to the spider obviates the problem of unsymmetrical stresses which might be created when the relatively large spider is rotating. The hub 12 transmits torque between the upper plate 24 of the spider and the shaft. This torque is transmitted to the solid member 10 thus eliminating the unsymmetrical stresses which may occur.

It can also be seen that the relatively large shear and bending stresses which are applied in two different planes with the usual construction are eliminated by the coupling means of this invention. This is accomplished by subjecting the dowels to three equal compressive forces all in the same plane. The dowel and adjacent parts are therefore subject to simple compression only. Since there is an engagement or intermeshing of parts around a common dowel the forces are supplied in a single plane thus eliminating the shear and bending stresses. This permits the size and length of the dowel to be considerably reduced. Another advantageous result of the annular projections 40 and 44 and the interengaging grooves 42 and 48 is that they serve to axially align the shafts thereby eliminating a separate spigot fit. The alignment with this type of coupling can be obtained by simple lathe machining and drilling of each part only and the more expensive operations such as milling or hobbing are not required. It is of course apparent that in a machine of the size illustrated herein the problem of proper alignment is considerable. The difficulty of the problem is substantially reduced by the coupling disclosed herein.

It should be apparent that other modifications of the invention may be made within the scope of the invention. For example, the grooves 42 and 48 need not be continuous but may be circumferentially spaced arcs about the shaft and the upper surface of the flange 36 of hub 12. In that case the projections 40 and 44 would be spaced and aligned so as to engage the arcuate grooves in the opposing surfaces. It should also be understood that although the coupling of this invention is illustrated for use in a large rotating dynamoelectric machine for coupling three parts together it may be used in other and different devices where it is desired to connect aligned rotating parts together. The coupling illustrated herein is utilized for coupling together three shafts or machine parts, but it will of course be understood that any number of two or more shafts or machine parts can be coupled by this means.

A certain specific embodiment of the invention has been shown and described for the purpose of illustration but it will be apparent that various other modifications and other embodiments are possible within the scope of the invention. It is to be understood, therefore, that the invention is not limited to the specific arrangement shown, but in its broadest aspects it includes all equivalent embodiments and modifications which come within the scope of the invention.

I claim as my invention:

1. A coupling for connecting a pair of rotatable cylindrical members in axial alignment comprising a plurality of annularly arranged of circumferentially spaced teeth on the end face of one of said members annular recess means for receiving said teeth on the end face of the other of said members, a first set of openings intermediate said teeth and and a second set of openings through recess means, corresponding openings intermediate said teeth and through said recess means being in axial alignment, said second set of openings being of a width greater than the width of said recess and a dowel extending through said aligned openings.

2. A coupling for connecting a pair of rotatable cylindrical members in axial alignment comprising an annular recess in the end face of one of said pair of cylindrical members, axially extending circumferentially spaced openings through said annual recess, said openings being greater in width than the width of said annular recess, an axially extending annular flange having axially extending, circumferentially spaced openings therethrough projecting from an end face of the other of said pair of cylindrical members, said annular flange being receivable in said annular recess in close fitting engagement, said end faces of said members being in juxtaposition, the openings in said first member being in alignment with the openings in said other member, and a dowel extending through said aligned openings.

3. In a dynamoelectric machine, the combination comprising a spider for a rotor, said spider comprising a pair of semicylindrical sections secured together and having a central opening, a solid cylindrical hub received in said central opening for securing said spider sections together and a shaft secured to said hub, coupling means for securing said shaft, said hub and said spider together, said coupling means including interengaging axially extending annular grooves and projections on the opposing faces of said hub, said spider and said shaft, circumferentially spaced openings through said grooves and said projections, said openings in said spider and said hub being in alignment with the openings in said shaft, and a dowel received in said aligned openings.

References Cited in the file of this patent
FOREIGN PATENTS 662,270    France ---------------- Mar. 18, 1929